United States Patent [19]

Giovando

[11] Patent Number: 5,235,010
[45] Date of Patent: Aug. 10, 1993

[54] ORGANIC OXYGEN-CONTAINING POLYMERIZATION COCATALYSTS

[75] Inventor: Gualtiero Giovando, Monforte d'Alba, Italy

[73] Assignees: Akzo N.V., Arnhem, Netherlands; Saint Peter S.r.l., Turin, Italy; a half-interest to each.

[21] Appl. No.: 768,265

[22] PCT Filed: Apr. 26, 1990

[86] PCT No.: PCT/EP90/00728

§ 371 Date: Oct. 21, 1991

§ 102(e) Date: Oct. 21, 1991

[87] PCT Pub. No.: WO90/12825

PCT Pub. Date: Nov. 1, 1990

[30] Foreign Application Priority Data

Apr. 26, 1989 [IT] Italy .................... 67301 A/89

[51] Int. Cl.$^5$ ............ C08F 4/06; C08F 4/08; C08F 4/10; C08F 4/26
[52] U.S. Cl. .................... 526/113; 526/117; 526/123; 526/200; 526/209; 526/212; 526/216; 528/275; 528/277; 528/280; 502/164; 502/167; 502/168; 502/169; 502/170; 502/171; 502/172; 502/160
[58] Field of Search .............. 502/164, 167, 168, 169, 502/170, 171, 172, 160; 526/135, 203, 113, 117, 123, 200, 209, 212, 216; 528/275, 277, 280

[56] References Cited

U.S. PATENT DOCUMENTS

| | | | |
|---|---|---|---|
| 3,539,479 | 11/1970 | Alberts | 260/22 |
| 3,663,599 | 5/1972 | Noshimura et al. | 260/475 P |
| 4,138,385 | 2/1979 | Uffner et al. | 502/167 X |
| 4,175,064 | 11/1979 | Landau et al. | 502/170 X |
| 4,426,246 | 5/1984 | McGinniss | 502/160 X |

FOREIGN PATENT DOCUMENTS

| | | |
|---|---|---|
| 3016051 | 10/1981 | Fed. Rep. of Germany . |
| 2429239 | 1/1980 | France . |
| 833764 | 4/1960 | United Kingdom . |
| 881629 | 11/1961 | United Kingdom . |

*Primary Examiner*—Patrick P. Garvin
*Attorney, Agent, or Firm*—Richard P. Fennelly; Louis A. Morris

[57] ABSTRACT

An accelerator composition for the curing of unsaturated maleic, allylic, vinylic and epoxy-type polyester resins is disclosed. The accelerator composition includes a complex of a salt of a metal selected from lithium, copper, manganese, magnesium, vanadium, iron and cobalt, with an oxygen-containing compound which is capable of forming a complex with the metal salt and includes at least one functional group selected from aldehyde, ketone, ether, ester and alcohol. Also disclosed are a curable resin composition including the foregoing accelerators and a curing process employing these accelerators.

10 Claims, No Drawings

ORGANIC OXYGEN-CONTAINING POLYMERIZATION COCATALYSTS

The present invention relates to polymerization cocatalysts for the curing of unsaturated maleic, allylic, vinylic and epoxide-type polyesters. The cocatalysts comprise organic oxygen-containing compounds and at least one salt of a metal chosen from copper, lithium, vanadium, manganese, magnesium, cobalt and iron.

It is known to use lithium salts for the curing of unsaturated polyesters. For example, U.S. Pat. Nos. 3,539,479 and 3,663,599 disclose the use of lithium salts for the polymerization of unsaturated polyesters. The lithium salts include lithium decanoate, lithium thiocyanate, lithium acrylate, lithium methacrylate and lithium soaps of unsaturated and saturated aliphatic carboxylic acids.

British patent 2,085,464 suggests the use of cobalt, manganese or lithium naphthenate or cobalt or tin octanoate as hardening accelerators for the peroxide curing of unsaturated polyesters. Further, Japanese patent J5-0032-284 discloses the heat hardening of polyester resins in the presence of peroxides and acid cobalt salts, acetoacetate or ascorbic acid compounds.

"Melt Polymerization of Bisphenol A (BPA) Cyclic Polycarbonate Oligomers; Rheokinetics of Polymerization Relevant to Reactive Processing," Stewart, K. R., Polym. Prepr. 89; Vol. 30 (2); pp. 575-76, discloses the use of lithium salts or acetylacetonates as polymerization catalysts for the polymerization of cyclic polycarbonate oligomers with bisphenol A. Although the polymerization catalyst used here is similar to that of the present invention, the polymerization system is quite different since it involves phenolic compounds.

Another example of phenolic-resin curing is given in JP-62-053330 wherein lithium acetylacetonate is employed as a hardening accelerator in the crosslinking of phenolic resins in the presence of spiro orthocarbonates.

Finally, DE 30 16 051 discloses the use of a hardening accelerator for unsaturated resins which comprises a mixture of a ketimine and an (in)organic cupric or ferric compound in combination with a standard hardener.

None of the foregoing curing systems for unsaturated polyesters is entirely satisfactory. They suffer from the disadvantages that some must be operated at high temperatures, they often give discoloration of the resultant polymer and they are slow.

It is therefore the object of the present invention to overcome one or more of these disadvantages by providing a novel curing accelerator for unsaturated allylic, maleic, vinylic and epoxidic polyesters, a curable composition of a resin and at least one curing accelerator and a process for curing these materials in the presence of this curing accelerator. These and other objects of the present invention will be apparent to one of ordinary skill in the art from the summary and detailed descriptions which follow.

SUMMARY

For the curing of unsaturated maleic, vinylic, allylic and epoxide-type polyesters, use as accelerators or cocatalysts is made of salts of a metal chosen from among lithium, copper, magnesium, manganese, vanadium, iron, and cobalt, in combination with one or more oxygen-containing compounds, that are capable of at least forming complexes with such salts and include at least one functional group selected from aldehyde, ketone, ether, ester and alcohol. Also within the invention are a curable resin composition including these accelerators and a curing process employing these accelerators.

DESCRIPTION

The present invention refers generally to processes for the curing of unsaturated maleic, allylic, vinylic, and epoxide-type polyesters by means of radical or ionic-radical catalysis, and provides accelerators/promoters for the curing process.

Certain metal salts that can form complexes with organic oxygen compounds, are able to substantially accelerate the process of curing of the abovementioned resins.

Salts of copper, lithium, magnesium, manganese, vanadium, cobalt and iron act as accelerators in the curing process in the presence of conventional peroxidic initiators in the presence of organic oxygen-containing compounds which are capable of forming complexes with these metals. The primary object of the invention is therefore, to provide an accelerator composition that comprises a complex of a salt of a metal chosen from among copper, lithium, magnesium, manganese, cobalt, vanadium and iron or combinations of these, with oxygenated compounds.

It is considered that the metal salt is able to form a complex with the oxygenated compound and consequently, the scope of the invention includes a composition comprising a complex of an organic oxygen-containing compound with a salt of a metal chosen from the above-mentioned group, as well as a curable resin composition including an accelerator and a process for curing unsaturated maleic, allylic, vinylic, and epoxy-type polyesters in the presence of at least one of these accelerators.

The complexes of the above-mentioned metals can be utilized as accelerators in combination with conventional initiators of the peroxide type in processes for curing unsaturated polyesters and such complexes can be employed along with known conventional accelerators and peroxidic initiators.

The salt employed for the formation of the metal complex is preferably a halide, nitrate, lactate, hexanoate or acetate. Chlorides are especially preferred.

In the procedure for curing of the above-mentioned resins, which is a further subject of the present invention, the complex compound acting as the accelerator is typically employed in such a way as to furnish an amount of metal which comprises between 0.1 and 200 ppm on the basis of the weight of the resin. More specifically, the preferred concentrations on the basis of the weight of the resin are as follows:

Li, from 1 to 100 ppm,
Co, from 1 to 20 ppm,
Cu, from 0.1 to 10 ppm,
Fe, from 5 to 150 ppm,
Mg, from 3 to 200 ppm, and
V, Mn, from 1 to 200 ppm.

Of course, combinations of two or more of these metals may be employed advantageously in a single accelerator composition.

In the procedure of curing, the accelerators that are the subject of the present invention can be employed in the presence of conventional quantities of peroxidic initiators. More particularly, between 0.02 and 5.0% by weight of peroxide initiator, on the basis of the weight of the resin, are employed. These accelerators generally permit a reduction in the amount of peroxidic initiator that can be employed as compared with the same curing system in the absence of accelerator. Conventional peroxide initiators known for use with unsaturated polyesters may be used.

The curing procedure of the present invention comprises the addition, to a resin or prepolymer, of a peroxide initiator and at least one accelerator in accordance with the present invention. Conventional accelerators may also be present during the curing procedure of the present invention in addition to the accelerators of the present invention. Further, other materials including thiols and nitrogen-containing compounds may be present during the curing process of the present invention.

Among the nitrogen compounds are included ammonia, ammonium salts, heterocyclic nitrogenous bases, cycloaliphatic primary amines and adducts of these materials with anhydrides or epoxides. More particularly, the nitrogen-containing compounds include ammonium acetate, cyclohexylaliphatic amines, secondary and tertiary $C_1$-$C_3$ alkylamines and addition compounds of the said amines. More specific examples of the amines include isophoronediamine, diaminodicyclohexylmethane, trimethylamine, triethylamine, diethylamine and dimethylamine. A more detailed description of the nitrogen-containing compounds and their adducts with anhydrides and epoxides can be found in applicants' copending U.S. Ser. No. 768,266 entitled, "Organic Nitrogen-Containing Polymerization Catalysts", filed on even date herewith.

The thiol compounds include mercaptans and more preferably materials containing at least two thiol groups, and their adducts with anhydrides or epoxides. More particularly, the preferred thiol compounds include dipentene dimercaptan, ethylcyclohexyl dimercaptan, ethylene-1,2-bis-3-mercaptoacetate, ethylene-1,2-bis-3-mercaptopropionate, 1,2,3-propanetrithiol, 1,2,6-hexanetrithiol, pentaerythritothiol, pentaerythritol tetramercaptoacetate, pentaerythritol tetramercaptopropionate, and thioesters of polyalcohols and sugars. A more detailed description of the thiol compounds and their adducts with epoxides and anhydrides can be found in applicants' copending U.S. Ser. No. 768,266 entitled, "Thiolic Compound Polymerization Cocatalysts", filed on even date herewith.

The thiol materials may be added to the accelerator compositions of the present invention in amounts of from 0.1 to 0.7% by weight for non epoxy-type polyesters and from 1-150% by weight for epoxy-type polyesters, based on the weight of the resin. The nitrogen-containing compounds are generally used in amounts of 0.01% to 20% by weight, based on the weight of the resin.

Another aspect of the curing procedure of the present invention comprises the curing of a curable mixture of a resin or prepolymer chosen from among the group of unsaturated polyester resins, maleic, allylic, vinylic and epoxy-type resins, and at least one ethylenically unsaturated reactive monomer in the presence of an accelerator. Typical ethylenically unsaturated reactive monomers include styrene and styrene derivatives such as α-methylstyrene, indene, divinyl benzene, stilbene, dibenzalacetone, propenyl benzene and isopropenyl benzene; triallyl cyanurate, triallyl isocyanurate and mixtures thereof. The monomer may comprise from 0 to 50 wt. % of the material, based on the weight of the resin.

The oxygenated compound is an oxygenated organic compound carrying an aldehyde, ketone, ether, ester, or alcohol group on the molecule. The oxygen-containing compound must also be capable of forming a complex with the metal salt.

Generally, the oxygen-containing compound enhances the known accelerating effect of the metal salt. Thus, sufficient oxygen-containing compound should be employed to enhance the accelerating effect.

In particular, the following can be employed as the oxygenated compound:

keto- and aldo-esters and ethers or alcohols, in particular methylacetoacetate, ethylacetoacetate, mono- and diesters of ketoglutaric acid, pyruvates, sugars such as glucose and fructose; and esters of ascorbic acid such as ascorbic palmitate;

1,3-diketones and aldehydes, in particular acetylacetone, benzoylacetone, and dibenzoylmethane;

mono- and diesters more in particular diethylmalonate and succinates;

1,2-diketones, in particular diacetyl and glyoxal; and certain polyalcohols and other alcohols such as diethylene glycol, benzyl alcohol and alcohols of the fatty series.

In the process of the present invention, the oxygen-containing compound is generally employed in an amount of 0.002 to 0.3 weight percent on the basis of the resin. Specific materials, such as ethylene glycol and ascorbic palmitate are preferably employed in amounts of 0.01 to 0.2 and 0.02 to 1 weight percent on the basis of the resin, respectively. In a further aspect, the present invention also relates to curable resin compositions which include the accelerators of the present invention therein.

In the curing process of the present invention, one begins with the resin composition. To this there may optionally be added an ethylenically unsaturated reactive monomer. The accelerator composition may be added in several different manners. For example, the accelerator composition may be pre-mixed to form the metal salt complex prior to it being added to the resin composition. Another possibility is to add the individual components of the accelerator composition to the resin and form the metal complex in situ. which of these methods is preferred will depend on the specific curing process being carried out.

Other additives, such as the peroxide initiator, or other accelerator enhancing materials may be added directly to the resin without first mixing them with the accelerator composition. However, in some cases it may be desirable to premix the accelerator enhancing materials with one or more of the accelerator components prior to introduction to the resin composition.

The curing process of the present invention may be carried out at any temperature from room temperature up to 250° C., depending on the initiator system, accelerator system and resin being cured. Other standard additives may also be employed including conventional accelerators.

The accelerators and process of the present invention will be further illustrated by the examples appended hereto.

EXAMPLE 1

An accelerator was obtained by taking 25 parts diethylene glycol, 25 parts butyl alcohol, 30 parts benzyl alcohol, 10 parts lithium chloride, 10 parts cupric chloride or copper acetate, and 1 part $CoCl_2.6H_2O$.

The result was a very dark brown, stable complex.

EXAMPLE 2

A complex accelerator was obtained by taking 70 parts diethylene glycol, 20 parts cupric nitrate trihydrate, and 10 parts magnesium chloride. The results of polymerization of 100 g of OSM NX 530 resin are shown in Table I.

EXAMPLE 3 preparation of accelerator (called alpha-accelerator in the following)

The accelerator was prepared by dissolving 2 g of lithium chloride in 18 g diethyleneglycol, and adding 25 g of acetylacetone and 12 g of a thiol adduct obtained by the addition reaction between methylnadic anhydride and pentaerythritoltetramercaptopropionate, in a mixed solvent of 8 g dimethylsulphoxide and 10 g tetrahydrofuran.

The thus obtained accelerator possesses a very low toxicity, and the polymerization tests relative to its application yielded colourless transparent polymerization products.

EXAMPLE 4

The accelerator obtained in example 3 was modified by the further addition of 2 g of manganese acetate. This accelerator, containing the manganese salt in addition to the lithium salt, presented an enhanced effect of gelation. Analogous accelerators can be obtained by using not the acetate but the lactate, chloride or ethyl-hexanoate of manganese (bivalent).

EXAMPLES 5–10

Effective accelerators were obtained according to the procedure of example 3 but using as the thiol any one of the following:
adduct of maleic anhydride with pentaerythritoltetramercaptoacetate;
adduct of 1,2,3-propanetrithiol with propane diglycidyl ether;
adduct of pentaerythritoltetramercaptoacetate with butane diglycidyl ether;
adduct of 1,2,3-propanetrithiol with glycerylglycidyl ether;
adduct of 1,2,3-propanetrithiol with Bisphenol-A glycidyl ether; and
adduct of dipentenedimercaptan with butanediglycidylether and pentaerythritoltetramercaptoacetate.

EXAMPLES 11–17

The alpha-accelerator obtained according to example 3, and the accelerator obtained according to example 4, were employed in tests of polymerization of the commercially available polyester resins DSM 530, DSM 170 and Alusuisse 5. Samples of 100-g size were taken and were processed in a thermostat bath of 25° C. The results of the polymerizations are reported in Table II.

The polymerization tests have yielded satisfactory results even in the absence of conventional peroxidic initiators. The optimal quantities of peroxidic initiator proved to range from 0.02 to 0.2%. All obtained samples were colourless and transparent, and none liberated styrene during cross-linking. After the cross-linking they did not smell of styrene, and showed high mechanical resistances.

The yield of the polymerization after 10 hours, with 2% of added peroxidic initiator, is about 95%, while it is about 85% when the extent of added peroxidic initiator equals 0.02%, in which latter case, the yield can be raised to 98% by post-curing for 2–4 hours at 50°–80° C.

EXAMPLE 18

"Beta" accelerator

This accelerator was obtained by mixing 7 g of isophoronediamine with 6 g of cresyldiglycidylether and 7 g of ethyleneglycol and heating at 80° C. for 1 hour. Separately, a mixture of 11 g ethylacetoacetate and 14 g methylnadic anhydride was prepared, and heated to 80° C. for 1 hour. The thus obtained products were mixed with the further addition of 0.15 g copper sulphate and 14.85 g diethyleneglycol.

EXAMPLE 19

The procedure of example 18 was repeated, with the isophoronediamine being replaced by diaminodicyclohexylmethane.

EXAMPLE 20

The procedure of example 18 was repeated, with the further addition of one gram of lithium chloride dissolved in 9 g of diethyleneglycol.

EXAMPLE 21

The procedure of example 18 was repeated, with the further addition of one gram of lithium chloride, and of magnesium chloride.

EXAMPLES 22–26

Polymerization tests were carried out, using the accelerators of examples 18, 20 and 21, on DSM NX 530 unsaturated polyester resin. The peroxidic initiator was 75% methylethylketone peroxide in dibutylphthalate in amounts varying between 0.1 and 0.3 weight %, referred to the weight of the resin sample which was 100 g. All tests were done in a thermostatted bath at 25° C. The results have been collected in Table III.

In this case again, the best results were obtained when using a quantity of initiator equal to about 1/10 of the conventional amount; the resulting samples were bright transparent yellow, very hard, and exhibited a low volatilization of styrene during and after the polymerization.

These tests demonstrate that the use of mixed complexes can, in certain cases, be particularly advantageous in terms of increased activity. As the experimental tests show, the invention provides new accelerators that are especially active in the curing of unsaturated, maleic, allylic and epoxy-type polyester resins. Such accelerators can be advantageously employed as they allow one to vary the temperature of the exothermal peak and the times of cross-linking, in accordance with requirements. These accelerators can find special application in the cross-linking of resins intended to embed delicate inserts, e.g. in the electronics and natural sciences fields.

The tests demonstrate that in the curing of the resin, one can utilize the afore-mentioned metal salt complexes, either ready-made or, alternatively, formed in-situ by adding to the resin the thiolic compound and oxygenated or nitrogenated compound and separately the metal salt.

TABLE I

| | Resin DSM NX 530 (100 g) Initiator: MEK Peroxide | | | | |
|---|---|---|---|---|---|
| Type of complex | Quantity of complex | Time of final gelation | Time from final gelation to exothermal peak | Tpe (°C.) | Note |
| Example 1 | 0,2% | 2% | 15' | 117 | Transparent, light green |
| Example 2 | 0,5% | 2% | 27' | 85 | Translucent, pale green |

TABLE II

| | Example | | | | | | |
|---|---|---|---|---|---|---|---|
| | 11 | 12 | 13 | 14 | 15 | 16 | 17 |
| | Polyester resin DSM 530 | | | Polyester resin DSM 170 | | Polyester resin ALu Suisse 5026 | |
| Peroxides* weight % to resin | 0,02% | 0,02% | 0,2% | — | 0,02% | — | — |
| Other per-compounds, weight % to resin | — | — | — | Sodium perborate 0.3%–5% | — | — | Per-carbonate 0.2%–25% |
| Time of final gelation | 11' | 13' | 6' | 16' | 8' | 25' | 15' |
| Temperature at exothermal peak (°C.) | 55° | 56° | 97° | 58° | 57° | 37° | 40° |
| Catalyst Example 3 | 1,5% | +++ | 1,5% | 1,5% | — | — | 1,5% |
| Catalyst Example 4 | — | 1,5% | — | — | 1,5% | 1,5% | — |

*Peroxides: methylethylketone peroxide or acetylacetone peroxide

TABLE III

| | Resin DSM NX 530 | | | | |
|---|---|---|---|---|---|
| Example | 22 | 23 | 24 | 25 | 26 |
| Peroxide %, weight to resin | 0,3% | 0,3% | 0,1% | 0,3% | 0,3% |
| Catalyst "β" (Ex. 18) | 1% | 2% | 1% | — | — |
| Catalyst "β" + Li (Ex. 20) | — | — | — | 2% | — |
| Catalyst "β" — Cu + Li + Mg (Ex. 21) | — | — | — | — | 1,5% |
| Time of final gelation | 4' | 2,30" | 14' | 16' | 17' |
| Time from final gelation to exothermal peak | 5' | 2' | 15' | 11' | 14' |
| Temperature at exothermal peak | 121° | 123° | 81° | 120° | 95° |

NOTE Light-yellow-coloured samples, transparent, very hard
-colourless
-translucent
-low-toxic

What is claimed is:

1. An accelerator composition for the curing of resins selected from the group consisting of unsaturated maleic, allylic, vinylic and epoxy-type polyester resins, said accelerator composition comprising a complex of at least two salts of at least two different metals selected from the group consisting of lithium, magnesium, manganese, copper, cobalt, vanadium and iron, and an organic oxygen-containing compound capable of forming a metal complex with said metal salts and including at least one oxygen-containing compound selected from the group consisting of methylacetoacetate, ethylacetoacetate, monoesters of ketoglutaric acid, diesters of ketoglutaric acid, pyruvates, sugars, esters of ascorbic acid, benzoylacetone, dibenzoylmethane, diethylmalonate, succinate esters, diacetyl, glyoxal, diethylene glycol, benzyl alcohol and fatty alcohols.

2. An accelerator composition as claimed in claim 1, wherein said oxygen containing compound is selected from the group consisting of diethylene glycol, ascorbic palmitate cresyl glycidylether, methylnadic anhydride and methylacetoacetonate.

3. An accelerator composition as claimed in claim 1 wherein at least one of said metal salts is selected from the group consisting of halide, nitrate and acetate.

4. An accelerator composition for the curing of resins selected from the group consisting of unsaturated maleic, allylic, vinylic and epoxy-type polyester resins, said accelerator composition comprising a complex of a salt of a metal selected from the group consisting of lithium, magnesium, manganese, copper, cobalt, vanadium and iron, an organic oxygen-containing compound capable of forming a metal complex with said metal salt and including at least one oxygen-containing compound selected from the group consisting of methylacetoacetate, ethylacetoacetate, monoesters of ketoglutaric acid, diesters of ketoglutaric acid, pyruvates, sugars, esters of ascorbic acid, benzoylacetone, dibenzoylmethane, diethylmalonate, succinate esters, diacetyl, glyoxal, diethylene glycol, benzyl alcohol and fatty alcohols, and at least one compound selected from ammonia, ammonium acetate, cyclohexylamine, isophoronediamine, diaminodicyclohexylmethane, trimethylamine, triethylamine, diethylamine, dimethylamine, dipentene dimercaptan, ethylcyclohexyl dimercaptan, ethylene-1,2-bis-3-mercaptoacetate, ethylene-1,2-bis-3-mercaptopropionate, 1,2,3-propanetrithiol, 1,2,6-hexanetrithiol, pentaerythritothiol, pentaerythritol tetramercaptoacetate, and pentaerythritol tetramercaptopropionate.

5. A process for the curing of a resin selected from the group consisting of unsaturated maleic, allylic, vinylic and epoxy-type polyesters, said process comprising the step of curing said resin in the presence of an effective amount of a curing accelerator as claimed in any one of claims 1–4.

6. A process in accordance with claim 5 wherein 0.02 to 5.0% by weight of a peroxide compound is present during said curing step.

7. A process in accordance with claim 6 wherein at least one ethylenically unsaturated reactive monomer is present during said curing step.

8. A curable resin composition comprising at least one resin selected from the group consisting of unsaturated maleic, allylic, vinylic or epoxy-type polyesters, and an effective amount of a curing accelerator which comprises at least two metal salts of at least two different metals selected from the group consisting of lithium, magnesium, manganese, copper, cobalt, vanadium and iron, and an organic oxygen-containing compound capable of forming a complex with said metal and including at least one oxygen-containing compound selected from the group consisting of methylacetoacetate, ethylacetoacetate, monoesters of ketoglutaric acid, diesters of ketoglutaric acid, pyruvates, sugars, esters of ascorbic acid, benzoylacetone, dibenzoylmethane, diethylmalonate, succinate esters, diacetyl, glyoxal, diethylene glycol, benzyl alcohol and fatty alcohols.

9. A curable resin composition in accordance with claim 8 which further comprises an effective amount of a peroxide curing agent.

10. A curable resin composition as claimed in any one of claims 8 or 9 which further comprises from 0–50 wt. %, based on the weight of said resin, of at least one ethylenically unsaturated monomer.

* * * * *

UNITED STATES PATENT AND TRADEMARK OFFICE
CERTIFICATE OF CORRECTION

PATENT NO. : 5,235,010
DATED : August 10, 1993
INVENTOR(S) : Gualtiero Giovando

It is certified that error appears in the above—identified patent and that said Letters Patent is hereby corrected as shown below:

Col. 3, line 27, delete "U.S. Ser. No. 768,266" and substitute -- PCT application --; and Col. 6, line 54, change "ma-leic" to -- maleic --.

Signed and Sealed this

Ninth Day of August, 1994

Attest:

BRUCE LEHMAN

Attesting Officer    Commissioner of Patents and Trademarks